(12) United States Patent
Sund et al.

(10) Patent No.: US 7,347,099 B2
(45) Date of Patent: Mar. 25, 2008

(54) PRESSURE TRANSDUCER WITH EXTERNAL HEATER

(75) Inventors: Wesley E. Sund, Eden Prairie, MN (US); Christina A. Nord, Shakopee, MN (US); Fred C. Sittler, Excelsior, MN (US); John McIntire, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 162 days.

(21) Appl. No.: 10/893,189

(22) Filed: Jul. 16, 2004

(65) Prior Publication Data

US 2006/0010983 A1     Jan. 19, 2006

(51) Int. Cl.
*G01L 9/00* (2006.01)
*G00L 9/00* (2006.01)

(52) U.S. Cl. .......................................... 73/754
(58) Field of Classification Search ................ 73/754, 73/708
See application file for complete search history.

(56) References Cited

U.S. PATENT DOCUMENTS

| | | | |
|---|---|---|---|
| 3,461,416 A | 8/1969 | Kaufman | 338/4 |
| 3,836,786 A * | 9/1974 | Lowther | 422/186.19 |
| 3,903,869 A * | 9/1975 | Bancalari | 128/202.12 |
| 4,295,117 A | 10/1981 | Lake et al. | 338/4 |
| 4,368,575 A | 1/1983 | Erichsen et al. | 29/610 |
| 4,507,973 A | 4/1985 | Barr et al. | 73/724 |
| 4,738,276 A | 4/1988 | Adams | 137/343 |
| 4,785,669 A | 11/1988 | Benson et al. | 73/718 |
| 4,875,135 A | 10/1989 | Bishop et al. | 361/283 |
| 4,878,458 A * | 11/1989 | Nelson | 122/4 A |
| 4,932,265 A | 6/1990 | Skuratovsky et al. | 73/727 |
| 4,984,468 A | 1/1991 | Hafner | 73/727 |
| 5,056,373 A | 10/1991 | Gray | 73/861.71 |
| 5,115,676 A | 5/1992 | Lee | 73/706 |
| 5,125,275 A | 6/1992 | Wilda et al. | 73/756 |
| 5,134,887 A | 8/1992 | Bell | 73/718 |
| 5,165,281 A | 11/1992 | Bell | 73/718 |
| 5,174,014 A | 12/1992 | Erichsen et al. | 29/621.1 |
| 5,285,690 A | 2/1994 | Koen et al. | 73/727 |
| 5,329,819 A | 7/1994 | Park et al. | 73/724 |

(Continued)

FOREIGN PATENT DOCUMENTS

EP     0 660 644     12/1994

(Continued)

OTHER PUBLICATIONS

European Search Report and Written Opinion from Application No. PCT/US2005/014267, filed Apr. 25, 2005.

*Primary Examiner*—Max Noori
(74) *Attorney, Agent, or Firm*—Westman, Champlin & Kelly, P.A.

(57) ABSTRACT

An improved pressure transducer is disclosed. The transducer includes a connector, an enclosure, a sensor portion, and an external heater disposed to heat the sensor portion. In some aspects, the sensor portion includes a sensor constructed from a brittle material and does not employ any fill fluid within the sensor. In another aspect, the invention includes a kit that adapts non-heated high purity vacuum transducers for heated use. The kit includes a connector portion and a heater portion that is coupled to the connector portion. The connector portion may also include one or more indicators.

29 Claims, 4 Drawing Sheets

U.S. PATENT DOCUMENTS

| | | | |
|---|---|---|---|
| 5,461,922 A | 10/1995 | Koen | 73/756 |
| 5,542,300 A | 8/1996 | Lee | 73/724 |
| 5,560,362 A * | 10/1996 | Sliwa et al. | 600/439 |
| 5,565,172 A * | 10/1996 | Capuano et al. | 422/83 |
| 5,625,152 A | 4/1997 | Pandorf et al. | 73/756 |
| 5,637,802 A | 6/1997 | Frick et al. | 73/724 |
| 5,656,780 A | 8/1997 | Park | 73/724 |
| 5,661,245 A | 8/1997 | Svododa et al. | 73/726 |
| 5,672,832 A | 9/1997 | Cucci et al. | 73/861.52 |
| 5,693,887 A | 12/1997 | Englund et al. | 73/723 |
| 5,731,522 A | 3/1998 | Sittler | 73/708 |
| 5,781,024 A * | 7/1998 | Blomberg et al. | 324/763 |
| 5,796,007 A | 8/1998 | Panagotopulos et al. | 73/716 |
| 5,798,462 A | 8/1998 | Briefer et al. | 73/722 |
| 5,808,206 A * | 9/1998 | Pandorf et al. | 73/756 |
| 5,811,685 A | 9/1998 | Grudzien, Jr. | 73/724 |
| 5,852,244 A | 12/1998 | Englund et al. | 73/706 |
| 5,861,558 A | 1/1999 | Buhl et al. | 73/777 |
| 5,867,886 A | 2/1999 | Ratell et al. | 29/595 |
| 5,899,962 A | 5/1999 | Louwagie et al. | 702/138 |
| 5,911,162 A | 6/1999 | Denner | 73/718 |
| 5,915,281 A | 6/1999 | Sparks | 73/862.581 |
| 5,932,332 A * | 8/1999 | Pandorf et al. | 428/220 |
| 5,939,639 A | 8/1999 | Lethbridge | 73/724 |
| 5,942,692 A | 8/1999 | Haase et al. | 73/724 |
| 5,965,821 A | 10/1999 | Grudzien | 73/724 |
| 5,974,893 A | 11/1999 | Balcarek et al. | 73/714 |
| 6,003,380 A | 12/1999 | Sasaki et al. | 73/720 |
| 6,009,757 A | 1/2000 | LeComte et al. | 73/724 |
| 6,029,525 A | 2/2000 | Grudzien | 73/718 |
| 6,050,145 A | 4/2000 | Olson et al. | 73/706 |
| 6,370,448 B1 | 4/2002 | Eryurek | 700/282 |
| 6,465,271 B1 * | 10/2002 | Ko et al. | 438/48 |
| 6,510,740 B1 | 1/2003 | Behm et al. | 73/708 |
| 6,588,280 B1 * | 7/2003 | Quigley et al. | 73/708 |
| 6,612,176 B2 * | 9/2003 | Poulin et al. | 73/708 |
| 6,772,640 B1 * | 8/2004 | Quigley et al. | 73/718 |
| 7,000,479 B1 * | 2/2006 | Poulin et al. | 73/708 |
| 2002/0083774 A1 * | 7/2002 | Poulin et al. | 73/708 |
| 2002/0174857 A1 * | 11/2002 | Reddy et al. | 123/520 |
| 2003/0012563 A1 * | 1/2003 | Neugebauer et al. | 392/365 |
| 2003/0221491 A1 | 12/2003 | Albert et al. | 73/724 |
| 2004/0169771 A1 * | 9/2004 | Washington et al. | 348/374 |
| 2005/0254055 A1 * | 11/2005 | Peng | 356/432 |

FOREIGN PATENT DOCUMENTS

| | | |
|---|---|---|
| JP | 5-332862 | 12/1993 |
| JP | 5-332865 | 12/1993 |
| JP | 5-332866 | 12/1993 |
| JP | 5-340828 | 12/1993 |
| JP | 6-174574 | 6/1994 |
| JP | 6-294691 | 10/1994 |
| SU | 1760388 | 9/1992 |
| WO | WO 91/13417 | 9/1991 |
| WO | WO94/01 041 A1 | 1/1994 |

* cited by examiner

PRESSURE TRANSDUCER WITH EXTERNAL HEATER

BACKGROUND OF THE INVENTION

The present invention relates to pressure/vacuum transducers. More particularly, the present invention relates to pressure/vacuum transducers for use in high purity applications.

Pressure/vacuum transducers are known. Such devices typically couple to a source of pressure or vacuum; generate an electrical characteristic that varies according to the pressure or vacuum; and provide an electrical representation of the varied electrical characteristic such that the vacuum or pressure can be known to an operator, or other parts of the process.

High purity pressure or vacuum transducers are a relatively small subset of general vacuum or pressure transducers. These devices are specifically adapted for exposure to extremely delicate and/or very clean processes. These are the types of processes where a particle breaking from the pressure transducer or even outgassing therefrom could have a deleterious effect on an entire processing line. One example of such an application is semiconductor processing.

Vacuum transducers for high purity applications involving, for example, the deposition or removal (etching) of materials, such as in the semiconductor industry, are frequently heated for a couple of reasons. First, such vacuum transducers are heated to potentially reduce the amount of deposited or etched material that accumulates on the vacuum sensor in the transducer. Additionally, known vacuum sensors and associated components are temperature sensitive, thus requiring the temperature of the transducer to be precisely controlled with a fully integrated heater. The integrated heater ensures that both the vacuum sensor and the associated components are maintained at the precisely controlled temperature.

The arrangement of an integrated heater maintaining a precise temperature of both the vacuum sensor and associated components has generated a number of problems in the art. For example, the integrated nature of the heater requires that the suppliers and customers of such devices carry an inventory of non-heated transducers as well as heated transducers often covering two to three temperature ranges. This requires three to four times the inventory of non-heated transducers alone, thus generating a much higher inventory than would be required if fully-integrated heaters were not required. Another problem of current designs is that customers must decide when they purchase the vacuum transducer, exactly where the transducer is going and what level of heating, if any, will be needed. A non-heated vacuum transducer simply cannot be transformed into a heated transducer. Thus, current designs are not scalable to the varying applications to which customers would wish to apply them. Yet another problem with current designs is that customers wishing to evaluate the effect of heating at various temperatures on a vacuum transducer for a given process must purchase a different transducer for each temperature to be evaluated. Customers generally may try different heaters on a single vacuum transducer alone and note the effects. Thus, simply attempting to determine which transducer to use will often generate the additional cost of purchasing one or more useless (at least for that application) vacuum transducers as well as the additional time of removing and installing various transducers during the process. Another problem with current designs is that the heater is integrated in the same housing as the sensor and electronics. This means that the electronics are constantly exposed to a higher temperature, which limits their useful life.

SUMMARY OF THE INVENTION

An improved pressure transducer is disclosed. The transducer is particularly adapted for sensing vacuum in high purity applications. The transducer includes a connector, an enclosure, a sensor portion, and an external heater disposed to heat the sensor portion. In some embodiments, the sensor portion includes a sensor constructed from a brittle material and does not employ any fill fluid within the sensor. In another aspect, the invention includes a kit that adapts non-heated high purity vacuum transducers for heated use. The kit includes a connector portion and a heater portion that is coupled to the connector portion. The connector portion may also include one or more indicators.

DETAILED DESCRIPTION OF THE PREFERRED EMBODIMENTS

Figure 1:
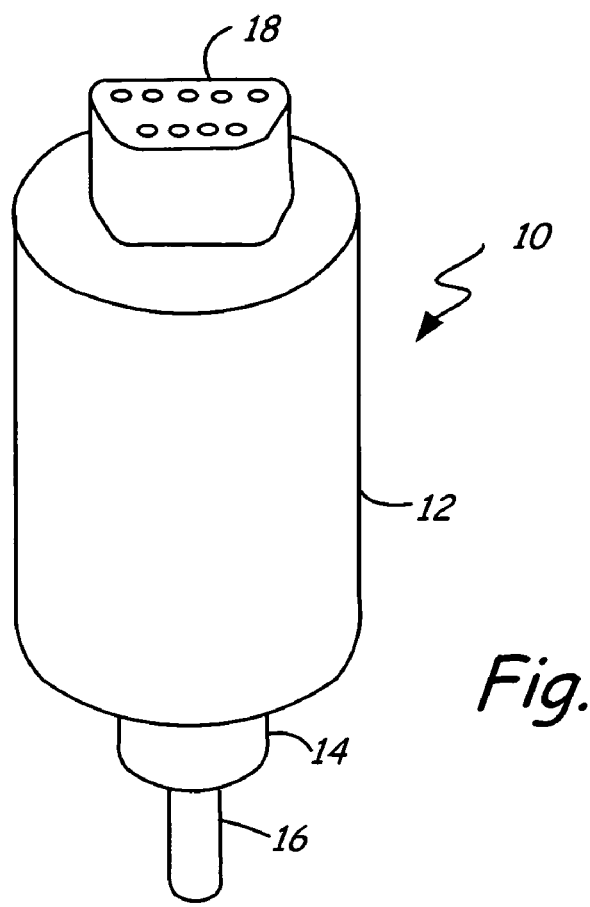
FIGS. 1 and 2 are diagrammatic views of high purity vacuum transducers with which embodiments of the present invention are particularly useful.
Figure 2:
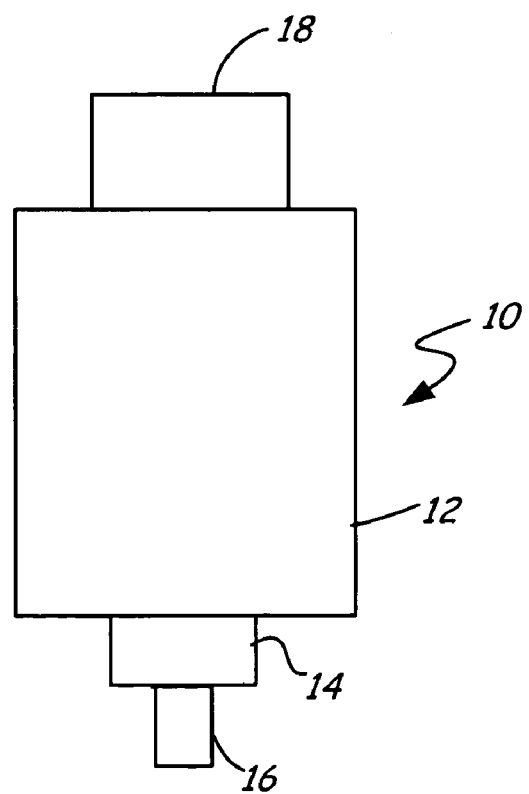

FIGS. 1 and 2 are diagrammatic views of high purity vacuum transducers with which embodiments of the present invention are particularly useful. Transducer 10 generally includes sensor electronics enclosure 12, sensor portion 14, process coupling 16, and electrical connector 18. Process coupling 16 is generally coupled to a source of vacuum, or pressure in a high purity environment and fluidly couples the source to sensor portion 14. A pressure sensor within module 14 has an electrical characteristic that varies with the pressure. Examples of such pressure sensors include, without limitation, deflectable diaphragm capacitance based sensors and deflectable diaphragm strain-based sensors. Electronics within sensor electronics enclosure 12 electrically couple to sensor portion 14 such that the changing electrical characteristic can be measured. Additional electronics within enclosure 12 may perform additional functions such as converting the electrical signal to a digital representation, as well as linearizing and/or characterizing the digital output. Additionally, the electrical output may be configured for transmission upon any suitable industry-standard process communication protocol, such as HART® or FOUNDA- TION™ Fieldbus protocols. A process control system and/or additional process-related devices may be coupled to electrical connector 18.

Figure 3:
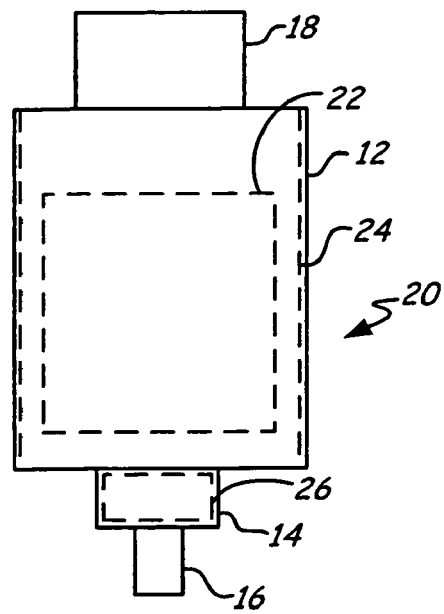
FIG. 3 is a diagrammatic view of a high purity vacuum transducer in accordance with the prior art.

FIG. 3 illustrates a high purity vacuum transducer in accordance with the prior art. Transducer 20 bears many similarities to transducer 10, and like components are numbered similarly. Transducer 20 includes sensor electronics 22 disposed within sensor electronics enclosure 12. Heating sources 24 and 26 are thermally coupled to enclosure 12 and portion 14, respectively. Heating sources 24 and 26 provide heat in order to reduce the amount of deposited or etched material that accumulates on the vacuum sensor in the transducer. On conventional designs, the heater must be very precisely controlled to maintain the accuracy of the transducer as the vacuum sensor and associated components are temperature sensitive. Thus, heat sources 24 and 26 are generally manufactured with transducer 20 and are integral therein. This creates a situation in which fully-manufactured transducers have specific temperature ranges.

Figure 4:
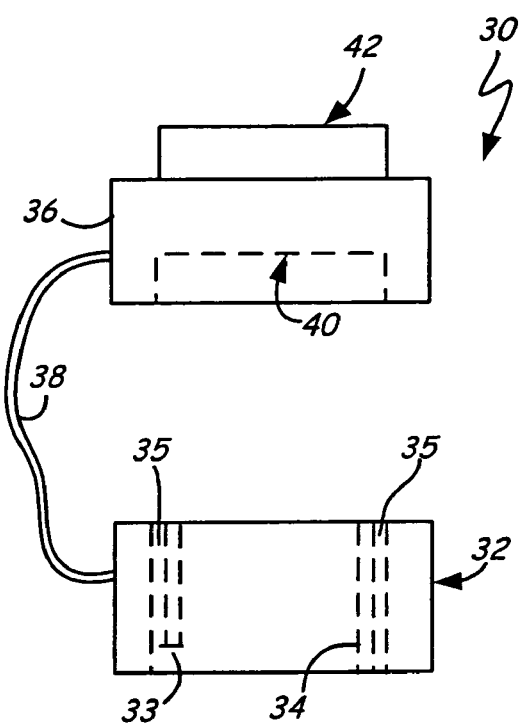
FIG. 4 is a diagrammatic view of a kit that can be applied to non-heated high purity vacuum transducers in order to practice embodiments of the present invention.

FIG. 4 is a diagrammatic view of a kit that can be applied to non-heated high purity pressure transducers in order to practice embodiments of the present invention. Kit 30 generally includes two parts. First, kit 30 includes heated portion 32 which is adapted to couple to sensor portion 14. In the embodiment shown in FIG. 4, heated portion 32 includes bore 34 sized to pass the outside diameter of sensor portion 14. Heated portion 32 includes one or more heating elements 35 that can take any suitable form including coils, cartridges, etched traces, et cetera. Clamping and/or other methods of affixing heated portion 32 to sensor portion 14 can be used. Connector 36 is electrically coupled to heated portion 32 via electrical connection 38. Connector portion 36 preferably includes circuitry to calculate a temperature of heated portion 32 using a temperature sensor 33 disposed within heated portion 32. Further, connector portion 36 includes known heater control circuitry (not shown) to selectively energize heating elements 35 within heated portion 32 in order to maintain heated portion 32 at an elevated temperature. Electrical connection 38 between connector portion 36 and heated portion 32 can include any suitable number of conductors. For example, in embodiments where heated portion 32 includes both an electrical heating element and a temperature sensitive element, connection 38 will include suitable conductors for all of the electrical heating elements and/or sensors within portion 32.

Connector portion 36 is preferably sized and configured to couple directly to connector 18 of a high purity pressure transducer at input 40. For example, when conductor 18 is a 25 pin D-subminiature male connector, input 40 will be a 25 pin D-subminiature female connector. Connector portion 36 also includes output 42, which is preferably configured to mimic the output of connector 18. In the above-example, output 42 would be a 25 pin D-subminiature male connection. This arrangement where input 40 and output 42 are merely gender-opposites of one another is preferred. However, it is expressly contemplated that these can be different types of connections. For example, input 40 could be a 9-pin D-subminiature female connection and output could be a 25-pin d-subminiature female connection as long as the proper connectors are configured to one another and the arrangement is accommodated by the system that couples to output 42.

Figure 5:
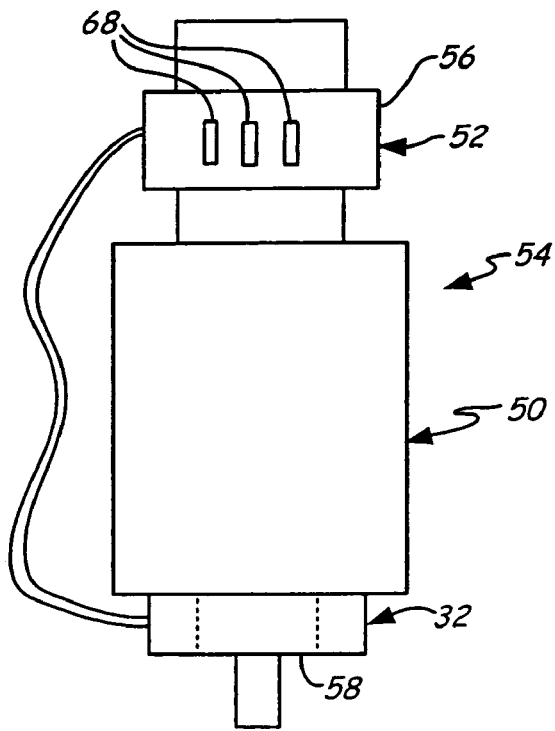
FIG. 5 is diagrammatic view of high purity vacuum transducer 50 coupled to an external heating kit 52 in accordance with embodiments of the present invention.

FIG. 5 is diagrammatic view of high purity pressure transducer 50 coupled to an external heating kit 52 in accordance with an embodiment of the present invention. System 54, comprised of transducer 50 and kit 52, is considered an externally heated high-purity pressure transducer system 54 in accordance with embodiments of the present invention.

In this embodiment, transducer 50 differs from transducer 20 in at least one important regard. Transducer 50 includes an improved sensor portion 58 disclosed more fully below. Portion 58 exhibits reduced hysteresis and temperature effects. Portion 58 allows for potentially less costly temperature control of the sensor portion as well as separate temperature compensation of the sensor.

Figure 6:
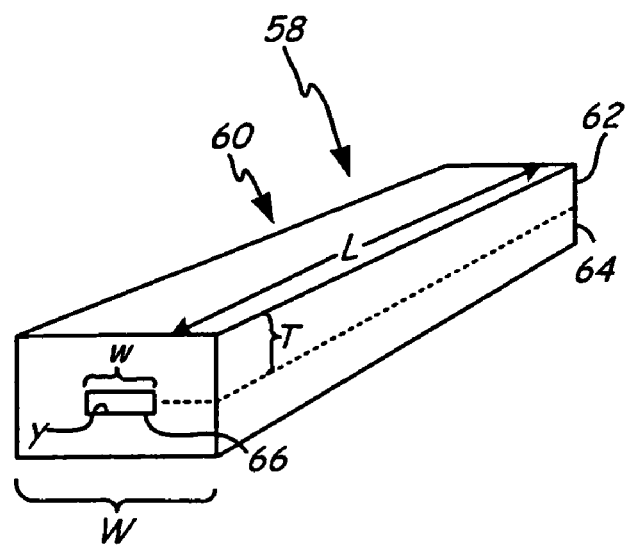
FIG. 6 is a diagrammatic view of sensor portion 58 that includes a sensor 60 formed from a pair of brittle material substrates.

FIG. 6 is a diagrammatic view of an exemplary sensor portion 58 that includes a sensor 60 formed from a pair of brittle material substrates 62, 64. This structure is known in the art of pressure sensing, and further information can be found in U.S. Pat. Nos. 5,637,802 and 6,089,097 to Frick et al., both of which are assigned to the Assignee of the present invention. FIG. 6 shows sensor 60 having upper substrate 62 and lower substrate 64 which form cavity 66 therebetween. FIG. 6 shows overall length L, thickness T, width W, minimum cavity width w of the deflecting structure of the sensing cavity and central deflection y due to applied pressure. Preferably, substrates 62 and 64 are formed of a single crystal material, such as sapphire, and are fusion bonded together to form an integral structure. In other words, the bond between substrates 62 and 64 is substantially free of foreign materials which could lead to inaccuracies or contamination. Further, it is preferred that sensor 60 operate without any fill-fluid, which is another source of potential contamination.

Returning to FIG. 5, kit 52 includes heated portion 32 disposed about, and thermally coupled to sensor portion 58 of transducer 50. Connector portion 56 of kit 52 is preferably identical to connector portion 36 (illustrated in FIG. 4) with the exception of indicators 58. Indicators 58 are coupled to circuitry within connector portion 36 in order to externally indicate the status of external heating kit 52, and/or high purity pressure transducer 50. In one embodiment, indicators 58 are LEDs. The LEDs can be used to indicate overall system power, energization of the heating element within heated portion 32, actual temperature below a desired temperature, actual temperature at a desired temperature, and/or actual temperature over a desired temperature. Additionally, indicators 58 may take any suitable form including, but not limited to, digital displays showing current temperature, set-point and/or alarm codes. Finally, indicators 58 can also be used to indicate conditions of the high purity vacuum transducer. For example, high purity vacuum transducer 50 may be endowed with diagnostic circuitry/software to enable transducer 50 to determine whether it is operating effectively, or whether it is in need of repair. The condition is then externally indicated by one or more of indicators 58.

As illustrated in FIGS. 4 and 5, connector portions 36 and 56 preferably have inputs and outputs that are of the same exact type of connection (such as 25 pin D-subminiature) but have inputs and outputs that are of opposite genders.

Figure 7:
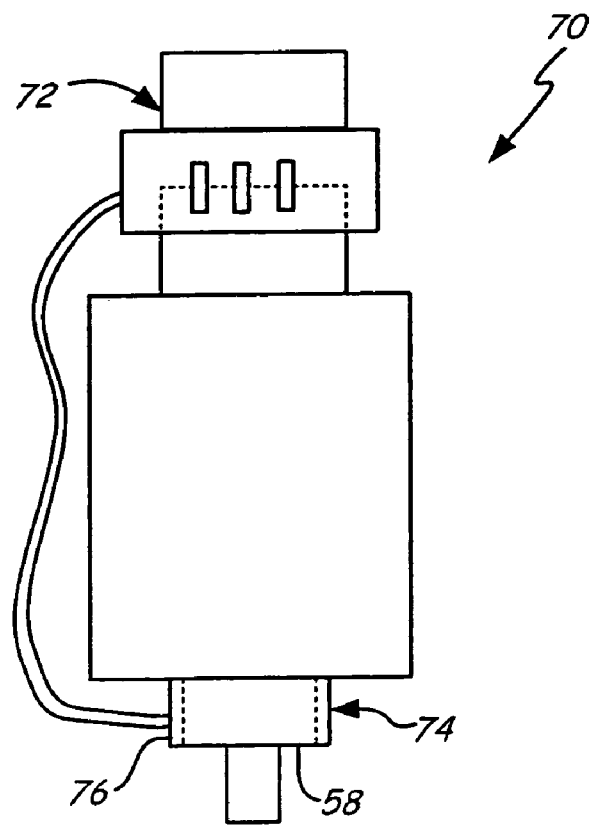
FIG. 7 is a diagrammatic view of a high purity vacuum transducer system 70 in accordance with another embodiment of the present invention.

FIG. 7 is a diagrammatic view of a high purity pressure transducer system 70 in accordance with another embodiment of the present invention. Transducer 70 includes external electric heater kit 72 that is somewhat similar to kit 52 described with respect to FIG. 5. However, heated portion 74 of kit 72 differs from heated portion 54 in that heated portion 74 is comprised of a wraparound heater sensor 76. Heater sensor 76 is formed of a generally flexible unit that when laid flat has a rectangular shape. Unit 76 includes heating elements and a temperature sensitive element such as a thermistor, thermocouple, or RTD. The rectangular dimensions of heater sensor wrap 76 are such that wrap 76 can be applied to pressure sensor portion 58 and will substantially envelop portion 58. In order to affix heater wrap 76 to portion 58, any suitable adhesive and/or clamping device can be used.

Figure 8:
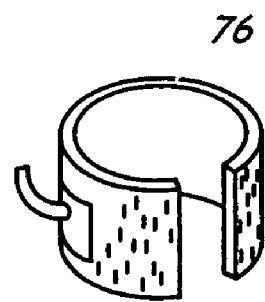
FIG. 8 is an enlarged diagrammatic view of wrap 76 in accordance with an embodiment of the present invention.

FIG. 8 is an enlarged diagrammatic view of wrap 76 in accordance with an embodiment of the present invention. As illustrated, wrap 76 is adapted to be disposed about sensor portion 58 and affixed thereto by virtue of an adhesive, a clamp, or both.

Figure 9:
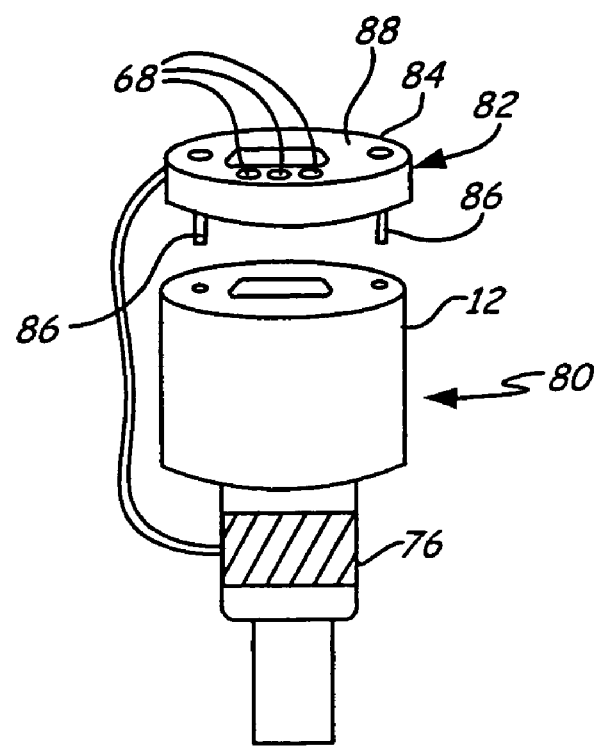
FIG. 9 is a diagrammatic view of an externally heated high purity vacuum transducer system in accordance with another embodiment of the present invention.

FIG. 9 is a diagrammatic view of an externally heated high purity vacuum transducer system 80 in accordance with another embodiment of the present invention. System 80 includes external heating kit 82 which includes heated wrap portion 76 electrically coupled to connector portion 84. Connector portion 84 differs from previously described connector portions in that connector portion 84 is sized to approximately the same outer dimensions (such as a diameter) as sensor electronics enclosure 12. Connector portion 84 provides additional space for circuitry therein. Preferably, connector portion 84 still includes a pair of substantially identical connectors, wherein the input and output connectors are of opposite gender. As illustrated, connector portion 84 preferably includes one or more fasteners 86 (such as screws) that ensure that connector portion 84 can be securely affixed to sensor electronics enclosure 12. Connector portion 84 also includes a plurality of indicators 58 in order to provide indications as described above. Indicators 58 are illustrated in FIG. 9 as being disposed on a top surface 88 of connector portion 84. However, indicators 58 can be disposed in any appropriate location.

The use of an heater/sensor assembly proximate the sensor portion of a pressure transmitter provides a number of benefits. First, the assembly can be removed and replaced if it fails. Additionally, different heater sensor assemblies can be quickly and easily interchanged in order to accommodate various applications and temperature ranges. For example, one assembly might be recommended for high temperatures; another assembly might be recommended for high heat power demands; and yet another assembly might be recommended for extremely precise thermal control. Accordingly, one assembly might be used for a first temperature range, while a second assembly might be used for a second temperature range. The first and second ranges may overlap, but they need not. Thus, the selection of assemblies can provide a wide degree of scalability.

Although the present invention has been described with reference to preferred embodiments, workers skilled in the art will recognize that changes may be made in form and detail without departing from the spirit and scope of the invention. For example, while embodiments of the present invention have generally focussed on sensing vacuum in a high purity environment, embodiments of the present invention could also be used with gas pressure transducers where the transducers are subject to Joule Thompson cooling created by expanding gasses.

What is claimed is:

1. A pressure transducer comprising:
    a connector;
    a sensor electronics enclosure;
    a sensor portion having a pressure sensor formed therein, the sensor portion being coupled to the sensor electronics enclosure;
    an external heater disposed about the sensor portion to elevate a temperature of the sensor portion; and
    a removable connector portion having an input and an output, the input being coupled to the connector of the transducer.

2. The transducer of claim 1, wherein the sensor is formed of a single crystal material.

3. The transducer of claim 1, wherein the sensor is fusion-bonded.

4. The transducer of claim 1, wherein the external heater includes at least one heating element.

5. The transducer of claim 1, and further comprising heater control circuitry disposed in the removable connector portion and being coupled to the external heater.

6. The transducer of claim 5, and further comprising a temperature sensor coupled to the heater control circuitry and being disposed to sense a temperature of the sensor portion.

7. The transducer of claim 1, wherein the external heater is coupled to the removable connector portion outside of the sensor electronics enclosure.

8. The transducer of claim 1, wherein the input and the output are of the same type of connection, but are gender opposites of one another.

9. The transducer of claim 1, wherein the connector portion includes at least one indicator.

10. The transducer of claim 9, wherein the at least one indicator includes an LED.

11. The transducer of claim 1, wherein the external heater includes a bore sized to pass the sensor portion.

12. The transducer of claim 1, wherein the external heater includes a temperature sensor for sensing a temperature of the sensor portion.

13. The transducer of claim 1, wherein the external heater includes a heater wrap affixed to the sensor portion.

14. The transducer of claim 13, wherein the heater wrap includes a temperature sensor for sensing temperature of the sensor portion.

15. The transducer of claim 1, wherein the transducer is a high purity transducer that senses a vacuum.

16. The transducer of claim 1, wherein the sensor is formed of a brittle material.

17. The transducer of claim 1, wherein the external heater is replaceable to vary an operating temperature range of the transducer.

18. The transducer of claim 4, wherein the at least one heating element is a coil.

19. The transducer of claim 4, wherein the at least one heating element is an etched trace.

20. A kit for externally heating a sensor portion of a pressure transducer, the kit comprising:
    a heater portion sized to externally attach to a sensor portion of a pressure sensor; and
    a connector portion coupled to the heater portion and adapted to selectively energize the heater portion in order to maintain the heater portion at an elevated temperature.

21. A plurality of kits for externally heating a sensor portion of a pressure transducer, the plurality of kits comprising:
    a first kit comprising:
        a first kit heater portion sized to externally attach to the sensor portion of a pressure transducer; and
        a first kit connector portion coupled to the first kit heater portion and adapted to selectively energize first kit heater portion in order to maintain the first kit heater portion at an elevated temperature in a first temperature range; and
    a second kit comprising:
        a second kit heater portion sized to externally attach to the sensor portion of the pressure transducer; and a second kit connector portion coupled to the second kit heater portion and adapted to selectively energize second kit heater portion in order to maintain the second kit heater portion at an elevated temperature in a second temperature range.

22. The kit of claim 20, wherein the heater portion includes a bore sized to pass the sensor portion of the pressure sensor.

23. The kit of claim 20, wherein the heater portion further includes a temperature sensor coupled to the connector portion.

24. The kit of claim 20, wherein the heater portion includes a heater wrap adapted to be affixed to an outer surface of the sensor portion.

25. The kit of claim 24, wherein the heater wrap includes a temperature sensor coupled to the connector portion.

26. The kit of claim 20, wherein the connector portion includes an input and an output, and wherein the input and output are of a same type of connection, but are gender opposites of one another.

27. The kit of claim 20, wherein the connector portion includes at least one indicator.

28. The kit of claim 20, wherein the pressure sensor is a high purity vacuum sensor.

29. The plurality of kits of claim 21, wherein the first and second temperature ranges do not overlap.

* * * * *